(12) United States Patent
Smith

(10) Patent No.: US 6,358,591 B1
(45) Date of Patent: Mar. 19, 2002

(54) FIRE-BLOCKING INSULATION BLANKET

(75) Inventor: Sherman S. Smith, Zionsville, IN (US)

(73) Assignee: Orcon Corporation, Union City, CA (US)

( * ) Notice: Subject to any disclaimer, the term of this patent is extended or adjusted under 35 U.S.C. 154(b) by 0 days.

(21) Appl. No.: 09/325,966

(22) Filed: Jun. 4, 1999

(51) Int. Cl.[7] .............................. B32B 3/04; B32B 1/04; B32B 27/04

(52) U.S. Cl. .......................... 428/74; 428/68; 428/121; 428/192; 428/920; 428/921; 442/54; 442/58; 442/136; 442/178; 442/180

(58) Field of Search ............................ 428/68, 74, 121, 428/192, 920, 921, 54, 58; 442/136, 172, 178, 180

(56) References Cited

U.S. PATENT DOCUMENTS

| | | | |
|---|---|---|---|
| 3,567,162 A | 3/1971 | Lea | 244/121 |
| 4,675,225 A | * 6/1987 | Cutler | 428/74 |
| 4,897,303 A | 1/1990 | McCullough et al. | |
| 5,108,821 A | 4/1992 | Dooley et al. | |
| 5,624,726 A | 4/1997 | Sanocki et al. | |
| 5,983,586 A | * 11/1999 | Berdan, II et al. | 52/407.3 |

OTHER PUBLICATIONS

Federal Aviation Administration (FAA), "Draft Burnthrough Test Standard for Aircraft Insulation," FAA on World Wide Web (http://www.fire.tc.faa.gov/burnthru.html), p. 16, (Mar. 24, 1999).

Federal Aviation Administration (FAA), "Full Scale Test Evaluation of Aircraft Fuel Fire Burnthrough Resistance Improvements," DOT/FAA/AR-98/52, FAA, Office of Aviation Research (Washington, D.C.), p. 36, (Jan. 1, 1999).

Federal Aviation Administration (FAA), "Evaluation of Fire Test Methods for Aircraft Thermal Acoustical Insulation," DOT/FAA/AR-97/58, FAA, Office of Aviation Research (Washington, D.C.), p. 16, (Sep. 1, 1997).

Darren C. Dodd, "An Investigation Into the Burnthrough Resistance of Fuselage and Cabin Structures," Conference Proceedings, International Aircraft Fire and Cabin Safety Conf., 1998, FAA on World Wide Web (http://www.fire.tc-.faa.gov/conference/schedules/fire4.html), p. 19, (Nov. 16, 1998).

J. Petit and A. Mansuet, "Development of a Small Scale Burnthrough Test Equipment," Conference Proceedings, International Aircraft Fire and Cabin Safety Conf., 1998, FAA on World Wide Web (http://www.fire.tc.faa.gov/conference/schedules/fire4/html), p. 9, (Nov. 16, 1998).

* cited by examiner

Primary Examiner—Terrel Morris
Assistant Examiner—Ula C. Ruddock
(74) Attorney, Agent, or Firm—O'Melveny & Myers LLP

(57) ABSTRACT

An insulation blanket is disclosed that contains fire-blocking materials for preventing rapid penetration of fire into an aircraft fuselage in case of a fire outside the aircraft. The insulation blanket contains at least one layer of fiberglass or other thermal-acoustic insulation material without fire-blocking properties, and one or more layers of fire-blocking material. The fire blocking material is wider than the thermal-acoustic insulation so that it may be folded against and attached to adjacent structural frame members of the fuselage. In the alternative, a thermal-acoustic insulation material is used that has fire-blocking properties instead of the separate layers of fire-blocking and thermal-acoustic insulation materials. A method for installing insulation blankets according to the present invention is disclosed, whereby a fire-blocking insulation portion of the blanket is folded against and attached to frame members of the aircraft using attachment posts or spring clips.

16 Claims, 4 Drawing Sheets

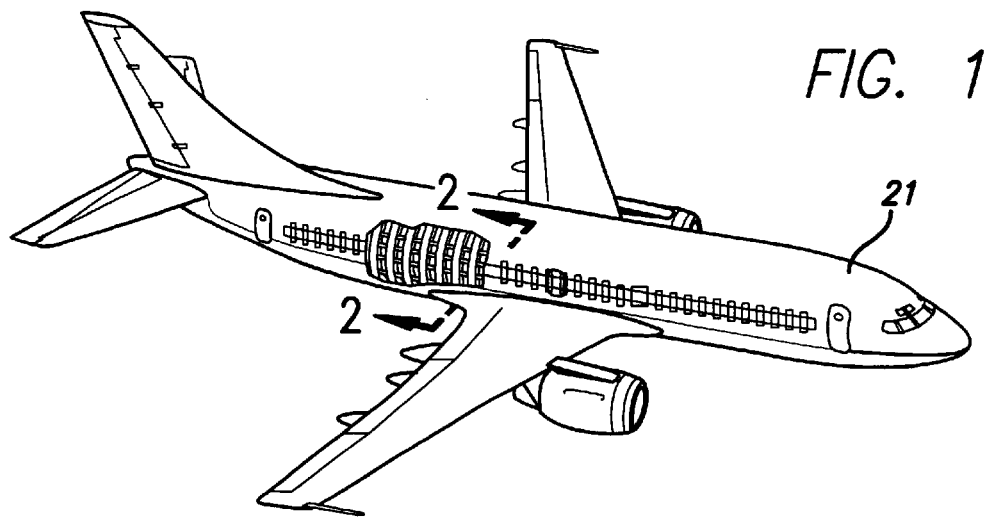
FIG. 1
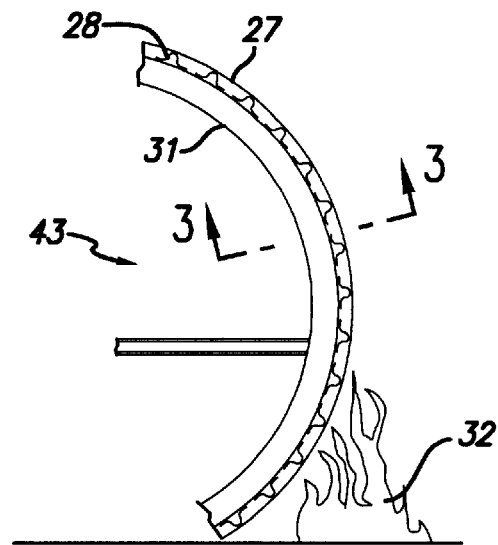
FIG. 2
FIG. 3
PRIOR ART
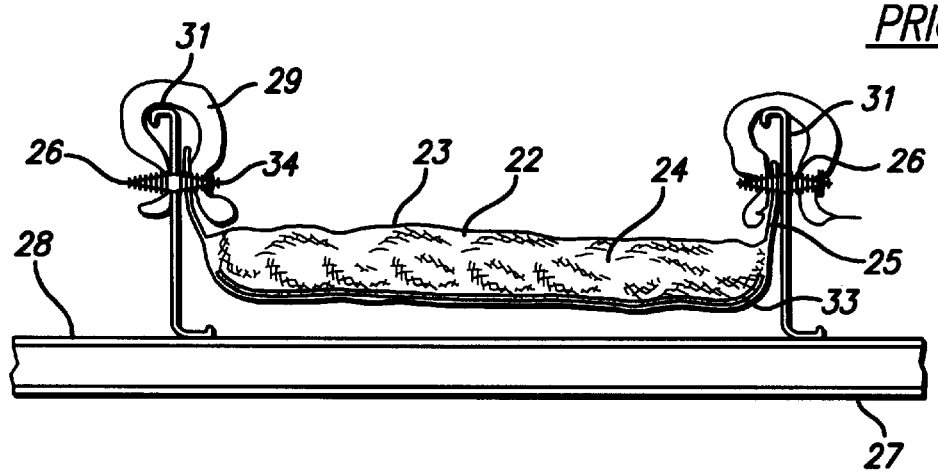

FIRE-BLOCKING INSULATION BLANKET

BACKGROUND OF THE INVENTION

1. Field of the Invention

This invention relates to insulation blankets for providing thermal and acoustic insulation for aircraft. More particularly, this invention relates to insulation blankets that contain fire-blocking materials for preventing rapid penetration of fire into an aircraft fuselage in case of a fire outside the aircraft.

2. Description of the Related Art

The passenger cabins of commercial passenger airplanes are insulated from temperature extremes and noise by the use of thermal/acoustic insulation blankets. Examples of such insulation blankets are described in U.S. Pat. No. 5,108,821 (Dooley, et. al.) and in U.S. Pat. No. 5,624,726 (Sanocki et. al.). Such insulation blankets are typically placed adjacent to the interior skin of the aircraft fuselage, between fuselage frame members that are typically parallel and spaced at regular intervals along the length of the fuselage. The insulation blankets are typically constructed to a uniform width to fit snugly between the fuselage frame members, and are attached to the frame members by means of connectors inserted through the selvedge of the insulation blanket. Other portions of the interior of the fuselage, such as the interior edges of the frame members, bulkheads, and ducts, are also insulated by means of blankets that are constructed to fit the particular portion to be insulated. The blankets have other features and qualities as described in U.S. Pat. Nos. 5,624,726 and 5,108,821, which are incorporated herein by reference.

Thermal/acoustic insulation blankets for aircraft are typically comprised of a fibrous lofted insulation such as fiberglass batting encased within a protective covering. The protective covering is typically made from primarily two pieces of lightweight, tear-resistant reinforced polymer films. The primary purpose of the protective covering is to prevent moisture from being absorbed by the fiberglass batting during the service life of the insulation blanket, to facilitate installation, and to protect the insulation batting from damage during installation. Other means for making the insulation blanket more rugged and impervious to moisture are available, but presently protective coverings made from lightweight reinforced polymer films are preferred. Typically a blanket is constructed by cutting two separate pieces of protective covering film to a shape slightly larger than the piece of batting to be contained. The two pieces of film are then joined together along the edges of the insulation batting to form a selvedge. The selvedge is typically a thin, ribbon-like structure between one-half inch and three inches wide, attached at its interior edge along a line roughly midway between the two major surfaces of the insulation batting and around the circumference of the insulation blanket. One function of the selvedge is to join and seal the two pieces of covering film together. The selvedge is also useful for attaching the insulation blanket to the aircraft frame as described below.

Insulation blankets are typically attached to the aircraft frame members using attachment posts, known in the industry as "Christmas trees," fixed to the frame members at intervals along the length of the frame members. The selvedge of the insulation blanket is put over the attachment post. The selvedge is held in place on the attachment post by a washer. The washer is held in place by annular serrations on the attachment post which are oriented to permit the washer to be slid onto the post more easily than it may be removed. Another typical attachment method uses u-shaped spring clips to clip the selvedge of the insulation blanket to the aircraft frame.

Fire-blocking materials for incorporation into insulation blankets are known in the art. For example, heat-treated partially carbonized polyacrylonitrile fibers known by the trade name CURLON® may be formed into fire-blocking high-loft batts with a density of 0.2 to 1.0 pounds per cubic foot (pcf), typically 0.2 to 0.5 pcf. CURLON fibers are available from ORCON Corporation of Union City, Calif., and are described in U.S. Pat. No. 4,837,076 (McCulloch et. al.). U.S. Pat. No. 4,897,303 (McCulloch et. al.) describes an insulation material made from CURLON fibers and suitable for use in aircraft. CURLON fibers may also be formed into felts and papers having densities of greater than about 1.0 pcf, typically 3 to 5 pcf. Other fire-blocking materials include ceramic materials such as refractory aluminoborosilicate and aluminosilica fibers known by the trade name 3M™ NEXTEL™, available from 3M Ceramic Fiber Products of St. Paul, Minn. U.S. Pat. No. 5,624,726 describes an insulation blanket incorporating a layer of NEXTEL fibers as a component. Other refractory materials, such as other ceramic fibers, basalt fibers, leached glass fibers, and rock wool, may also be used as fire-blocking materials if processed into a suitable form for use in aircraft insulation blankets.

The purpose for incorporating fire-blocking materials such as CURLON into insulation blankets is to protect the occupants of the aircraft in case of a ground fuel fire. A ground fuel fire, often called a "post-crash" fuel fire, occurs when fuel spilled on the ground outside the fuselage of a grounded aircraft ignites. Survivable post-crash fuel fires have occurred in the past after crash landings that were not severe enough to cause the fuselage to be destroyed upon impact, but were severe enough to cause fuel to spill from the aircraft and ignite. Survival rates from such crashes may be improved if the occupants are protected from the fire long enough to evacuate the aircraft. If the fuel fire penetrates the fuselage interior too quickly, the occupants will be overcome by smoke and heat before they can evacuate the aircraft, and will perish in the fire.

Tests conducted by the Federal Aviation Administration have shown that a typical aircraft fuselage insulated with fiberglass will provide about 1.5 to 2 minutes of protection from an intense fuel fire, before flame penetration occurs. Insulation blankets made with fire-blocking materials such as CURLON and NEXTEL can provide over five minutes of protection. However, in order to provide this extended period of protection, the insulation blankets must remain in position after the aluminum skin of the aircraft is consumed or melted away (typically in 20 to 60 seconds). In addition, the fire-blocking insulation must be firmly secured to the aircraft frame members so that no gap forms between the edge of the blanket and the aircraft frame. Such a gap would provide a pathway for the penetration of flames into the aircraft's interior, even if the insulation blanket remains generally in place.

Current methods commonly in use for securing insulation blankets to aircraft frame members will reduce the effectiveness of fire-blocking insulation blankets. The selvedge currently used to secure the insulation blanket will rapidly melt or burn when exposed to the heat of a fuel fire. When its selvedge is destroyed, the insulation blanket can fall away from the attachment post or spring clip holding it in place on the frame, allowing flames to penetrate into the interior of the aircraft. It is desirable for a fire-blocking insulation blanket to remain secured in place for at least two minutes, and preferably for more than five minutes, when subjected to a fuel fire. It is further desirable to secure fire-blocking insulation blankets to the aircraft frame members so that no gap permitting flame penetration forms between the aircraft frame members and insulation blanket when subjected to a fuel fire. Current insulation blankets and methods of attachment will not provide the desired duration and quality of attachment when exposed to a fuel fire.

SUMMARY OF THE PRESENT INVENTION

The invention provides an insulation blanket for aircraft that includes thermal/acoustic insulation, such as lofted fibrous insulation, foam insulation, or a combination thereof, and one or more fire-blocking layers of material adjacent to the insulation and extending past the edges of the insulation so that at least one fire-blocking layer may be attached to the aircraft frame members along the edges of the insulation blanket. The insulation and fire-blocking layer or layers are preferably encased in a protective covering. The insulation and fire-blocking layer or layers may be, but need not be, adhered to one another.

In an alternative embodiment of the invention, the lofted insulation is made from a fire-blocking material so that a separate fire-blocking layer is not needed. The insulation is preferably encased in a protective covering. The insulation and insulation blanket are wider than the spacing of the aircraft frame members so that the edges of the insulation blanket may be attached to the aircraft frame members along the edges of the insulation blanket.

In an alternative embodiment of the invention, the fire-blocking layer is adjacent to or adhered to the outside surface of the protective covering on one side or both sides of the insulation blanket. The fire-blocking layer extends past the edges of the insulation so that the fire-blocking layer may be attached to the aircraft frame members along the edges of the insulation blanket. Preferably, the fire-blocking layer is treated with a water repellent substance or encased within a separate protective covering to prevent absorption of moisture. Depending on the method used to assemble the insulation blanket, this configuration permits easier joining of the edges of the protective covering encasing the lofted or and/or foam insulation. Furthermore, the fire-blocking material need not be attached to the protective covering, allowing it to exist as a separate piece until the insulation blanket is installed. For older aircraft that are being retrofit for improved fire blocking performance, this permits re-use of the existing insulation blanket. The existing insulation blanket is removed from the frame members and the fire blocking material which has been cut to size is installed and attached to the frame members. The insulation blanket is then replaced on the inboard side of the fire blocking material and secured in place. Preferably, the fire-blocking material is treated with a water repellent substance to prevent absorption of moisture.

In an alternative embodiment of the invention, the lofted and/or foam insulation, and the fire-blocking layer are not encased within a protective covering. The fire-blocking layer is adhered to the insulation and extends past the edges of the insulation so that the fire-blocking layer may be attached to the aircraft frame members along both long edges of the insulation blanket. Preferably, the fire-blocking layer and attached lofted insulation are treated with a water repellent substance to prevent absorption of moisture.

In this application:

"Lofted insulation" refers to thermal and/or acoustic insulation material with an aggregate density of no greater than one pound per cubic foot of material, which is readily compressible and which will substantially resume its original shape after removal of a compressive force.

A "fire-blocking material" is a sheet material with an aggregate weight per unit area of one-quarter (0.25) pounds per square foot or less that exhibits a burn through time of 60 seconds or more when tested using the fire blocking material screening test described below in Example 2.

A "fire-blocking insulation blanket" is an insulation blanket that incorporates one or more layers of fire-blocking material or lofted and fire blocking insulation.

A "lofted and fire blocking insulation" is lofted insulation with essentially uniform aggregate density that exhibits a burn through time of 60 seconds or more when specimens no greater than three inches thick are tested using the fire blocking material screening test described below in Example 2.

An "insulation blanket" or "blanket" is an assembly of thermal and/or acoustic insulation and other materials which is formed to a specific shape and configuration for use in a specific structure such as an airplane, house, office building, warehouse, truck, bus, train, or ship.

A fire-blocking insulation blanket constructed and installed according to the present invention will remain secured in place for at least two minutes, and preferably for more than five minutes, when subjected to the full-scale test described in the report titled "Full-Scale Evaluation of Aircraft Fuel Fire Burnthrough Resistance Improvements," published by the United States Department of Transportation, Federal Aviation Administration (FAA), Fire Safety Section in January, 1999. In the same test, no gap permitting flame penetration will form between the aircraft frame members and the edges of a blanket constructed and installed according to the present invention for at least two minutes, and preferably for more than five minutes. Because the FAA test is designed to simulate realistic conditions during a post-crash fuel fire, it is anticipated that blankets according to the present invention will provide superior protection from flame penetration under real-world conditions.

Another advantage offered by the present invention is reducing the cost of retro fitting existing aircraft with insulation blankets having improved fire-blocking properties. According to FAA regulations, every modification to an existing aircraft must be documented. In the case of insulation blankets, any modification that requires changes to design drawings will typically have to be incorporated into over a thousand drawings for every airplane model. Therefore, providing an improved insulation blanket that may be fabricated without requiring changes to the original blanket drawings can result in significant cost savings. The present invention may be practiced by placing a layer of fire blocking material adjacent to the outboard side of the insulation blanket. The fire blocking layer may be incorporated into one of the two pieces of polymer protective covering films typically used to encase the lofted insulation, or it may be separate from the protective covering. The fire blocking layer will typically have the same or similar geometry as the outboard piece of protective covering film. Therefore it may be cut from the same template as the original piece of protective covering. To document the change, the aircraft operator need only revise the bill of materials and part number for the insulation blankets to specify the replacement film incorporating a fire-blocking material. Therefore, the more time-consuming changes to the geometric blanket patterns, including drawings and templates, may be avoided.

Blankets constructed and installed according to the present invention are especially useful for providing economical and effective fire-blocking insulation for aircraft. However, such blankets may also be used to provide fire-blocking insulation to any structure, such as a ship, bus, or building, that utilizes frame members that are (a) sufficiently fire-resistant to hold a fire-blocking blanket in place for the desired period of time, (b) adjacent to the exterior of the space which is to be protected from fire, and (c) configured to permit installation of insulation blankets between and attached to adjacent frame members. It is anticipated that blankets according to the present invention will be advantageous whenever fire-blocking replacements for regular (non-fire-blocking) insulation blankets are needed. In addition, blankets according to the present invention will be especially advantageous as replacement blankets whenever there is a need to conserve use of relatively costly and/or heavy fire-blocking material, because efficient use is made of a minimum amount of fire-blocking material.

Other features and advantages of the invention will be apparent from the following description of the preferred embodiments thereof, and from the claims.

BRIEF DESCRIPTION OF THE DRAWINGS

FIG. 1 is a perspective view of an airplane with a portion of the outer skin of the fuselage broken away to show the parallel frame members and stringers of the aircraft.

FIG. 2 is an enlarged cross-sectional view of a portion of a typical airplane fuselage, taken generally along the line and in the direction indicated by the arrows 2—2 in FIG. 1, showing how flames from a spilled fuel fire impinge upon the skin of the aircraft.

FIG. 3 is an enlarged cross-sectional view, taken generally along the line and in the direction indicated by the arrows 3—3 in FIG. 2, showing details of insulation blankets constructed and installed between parallel aircraft frame members and interior to the skin in a manner typical of the prior art.

DESCRIPTION OF PREFERRED EMBODIMENTS

Figure 4:
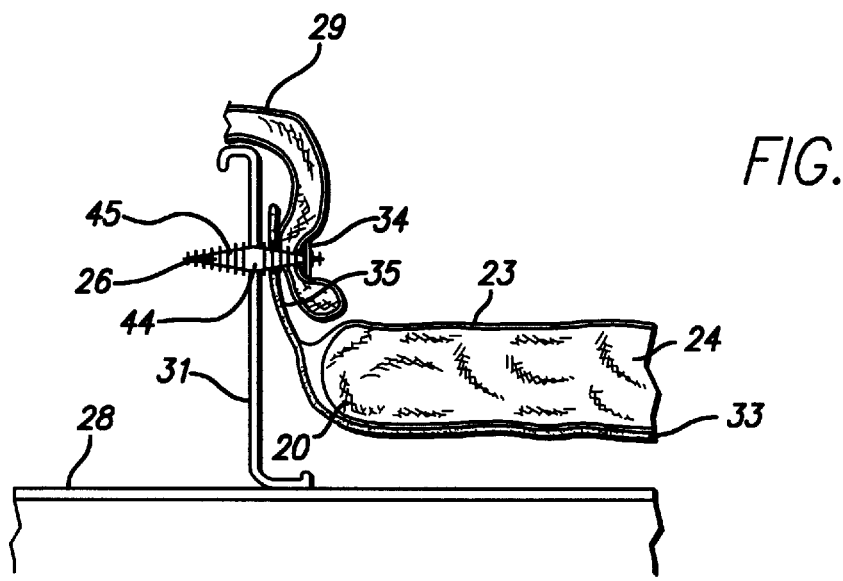
FIG. 4 is a enlarged fragmentary cross-sectional view, taken generally along the line and in the direction indicated by the arrows 3—3 in FIG. 2, showing details of improved fire-blocking insulation blankets constructed and installed between the aircraft frame members and interior to the skin according to an embodiment of the present invention.

An improved fire-blocking blanket constructed according to one embodiment of the present invention is indicated generally by the reference numeral 20 in various views of the drawings.

One application for the improved fire-blocking blanket of the present invention is as an insulation blanket for use between parallel frame members 31 (also known as ribs) of an aircraft 21 adjacent to the interior side of the aircraft's skin 27 as shown in FIGS. 1 and 2. An aircraft equipped with blankets constructed and installed according to the present invention will better prevent flame penetration from a spilled fuel fire 32 into the interior of an aircraft 43 as shown in FIG. 2 compared to a fire-blocking blanket 22 constructed according to the prior art as shown in FIG. 3.

Figure 5:
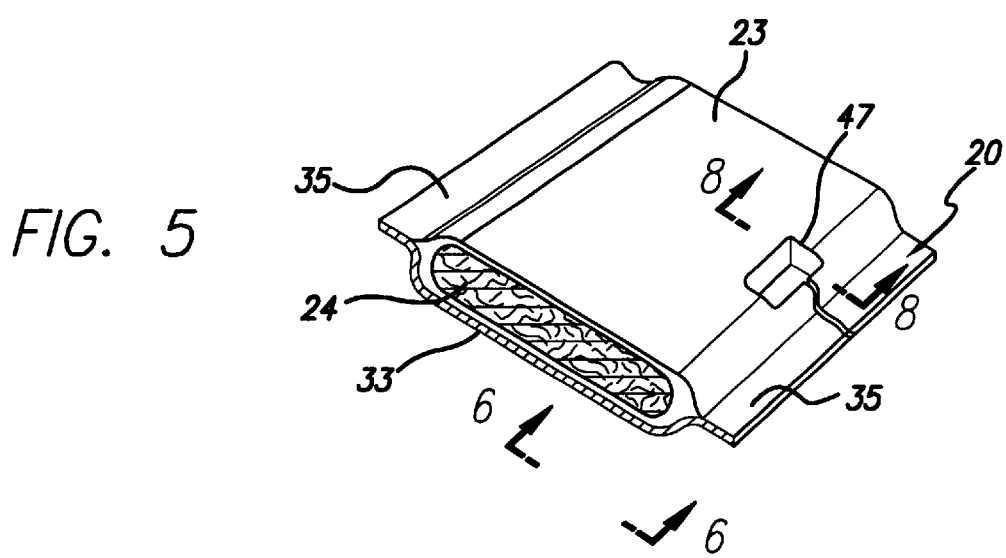
FIG. 5 is an isometric view of a part of an improved fire-blocking insulation blanket constructed according to an embodiment of the present invention.

Referring to FIG. 5, insulation blanket 20 includes lofted insulation 24 preferably encased within protective covering 23 and a layer of fire-blocking material 33 adjacent to the protective covering 23. The width of the lofted insulation 24 is designed to fit snugly between adjacent frame members of the aircraft along its edges located at selvedges 35. Typically the insulation blanket 20 is rectangular in shape, and is longer than it is wide with two parallel long edges and two parallel short edges. However, insulation blanket 20 may be made to any shape necessary to fit between adjacent frame members, parallel or not. Protective covering 23 is made from two pieces of reinforced polymer film joined together along all edges of the insulation blanket to form selvedges 35. The fire-blocking material 33 extends beyond the width of the lofted insulation 24 and into the selvedges 35. The fire-blocking material must be of sufficient width to permit the fire-blocking material to be folded against and attached to adjacent frame members of the aircraft when the blanket is installed.

Figure 6:
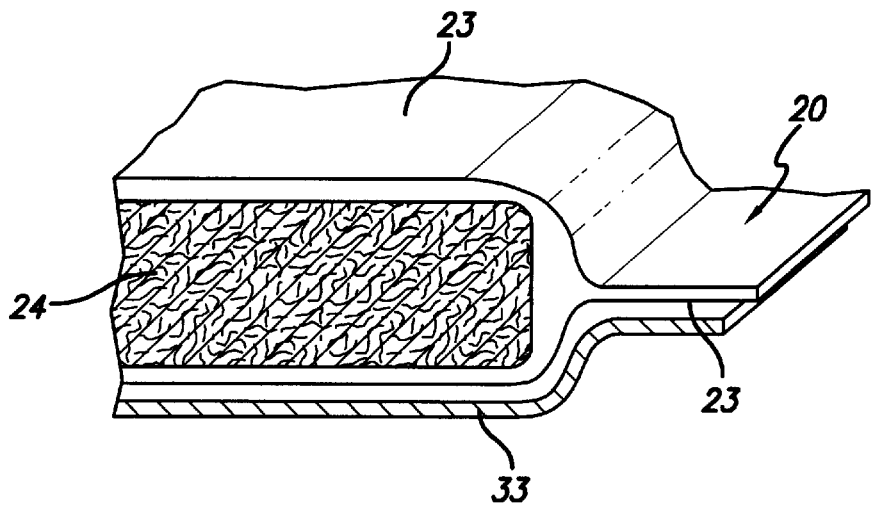
FIG. 6 is an enlarged, exploded, fragmentary cross-sectional view, taken generally along the line and in the direction indicated by the arrows 6—6 in FIG. 5, showing details of an improved fire-blocking insulation blanket according to an embodiment of the present invention.

The fire-blocking layer may be incorporated into the blanket in various configurations. FIG. 6 is an exploded view of one such configuration, wherein the fire-blocking layer 33 is adjacent to the protective covering 23 on the opposite side of lofted insulation 24, exterior to the blanket. The fire-blocking material 33 extends beyond the lofted insulation 24. The fire-blocking material must be of sufficient width to permit the fire-blocking material to be attached to adjacent parallel frame members of the aircraft when the blanket is installed. To prevent the fibrous fire-blocking layer 33 from absorbing moisture, it may be treated with a water-repellent substance. Fire-blocking layer 33 may be adhered to protective covering 23 for new installations, or may be a separate piece for retrofit applications. An advantage of this configuration is that it is compatible with common methods for manufacturing insulation blankets. In the manufacture of aircraft insulation blankets, protective covering films coated with or comprised of a thermoplastic material are commonly used. Such films are joined directly to one another by the application of heat or ultrasonic energy sewing or taping. The configuration shown in FIG. 6 has the advantage of permitting two protective covering films 23 with thermoplastic properties to be joined directly to one another because there is no intervening layer of fire-blocking material between the layers of protective covering.

Figure 7:
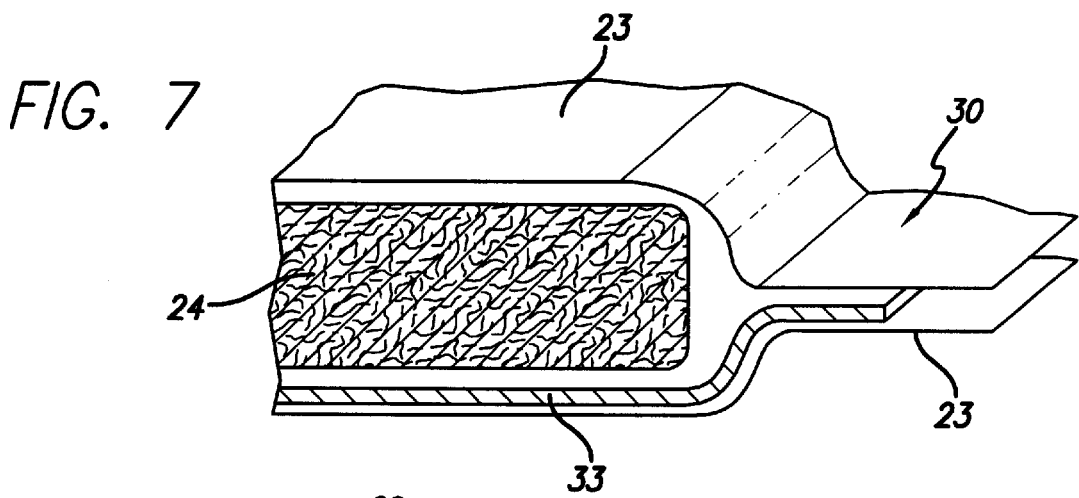
FIG. 7 is an enlarged, exploded, fragmentary cross-sectional view, taken generally along the line and in the direction indicated by the arrows 6—6 in FIG. 5, showing details of an improved fire-blocking insulation blanket according to another embodiment of the present invention.

The fire-blocking layer may be incorporated into the interior of the blanket. Referring to FIG. 7, fire-blocking layer 33 and lofted insulation 24 are both positioned between the protective coverings 23. Fire-blocking layer 33 and the protective covering films 23 are preferably joined together adjacent to the edge of lofted insulation 24 by sewing or by an adhesive, to hold the lofted insulation in place relative to the fire-blocking layer 33 and protective covering 23. Protective covering films 23 are joined to together along all edges of the insulation blanket.

The configuration shown in FIG. 7 has the advantage of protecting the fire-blocking layer from direct contact with the environment exterior to the insulation blanket. However, it has the disadvantage of requiring the protective coverings and fire-blocking layer to be sewn or glued together adjacent to the edge of the lofted insulation. Sewing is acceptable, but less desirable because sewing perforates the protective covering and reduces its effectiveness as a moisture barrier. Application of adhesives to join the materials is also acceptable, but less desirable because handling and placement of adhesive often causes manufacturing difficulties and adds weight. In the configuration shown, protective covering 23 extends beyond the fire-blocking layer 33 so that the two pieces of protective covering can be joined directly to one another. However, the insulation blanket can also be constructed so that the protective covering does not extend beyond the fire-blocking layer.

In FIG. 6 and FIG. 7, both show one layer of fire-blocking material 33 and one layer of lofted insulation 24. However, the invention may be practiced with more than one layer of fire-blocking material and/or more than one layer of lofted insulation. Additionally, a layer or layers of fire-blocking material may be interposed between layers of lofted insulation, so long as at least one layer of fire-blocking material is made of sufficient width to extend beyond the lofted insulation and to permit the fire-blocking material to be attached to adjacent frame members of the aircraft when the blanket is installed. Nevertheless, configurations with only one layer each of fire-blocking material and lofted insulation are simpler to construct and therefore are preferable. It is further preferable to locate the fire-blocking insulation on the outboard side of the lofted insulation, so that the lofted insulation is protected from an exterior fire by the fire-blocking layer and can provide thermal protection during a fire.

Most fire-blocking materials, such as ceramic fibers, are relatively dense and heavy materials that can not readily be formed into lofted insulation battings with good thermal and acoustic insulation properties. However, at least one fire-blocking material, CURLON® from ORCON Corporation of Union City, Calif. , can be made into a lofted insulation batting with good thermal and acoustic insulation properties. It is preferable to make lofted insulation battings from a blend of CURLON and 20% to 40% polyester, polypropylene, or other polymer binder fibers to lend the battings greater integrity and resiliency. Other fire-blocking materials, such as ceramic fibers, can also be blended with materials having insulating properties, including CURLON, and formed into lofted battings having both insulating and fire-blocking properties. Lofted and fire-blocking insulation is available from ORCON Corporation under the trade names CURLON OB-302 and CURLON OB-300 (formerly ORCOBLOC™ 302 and ORCOBLOCK™ 300).

Figure 8:
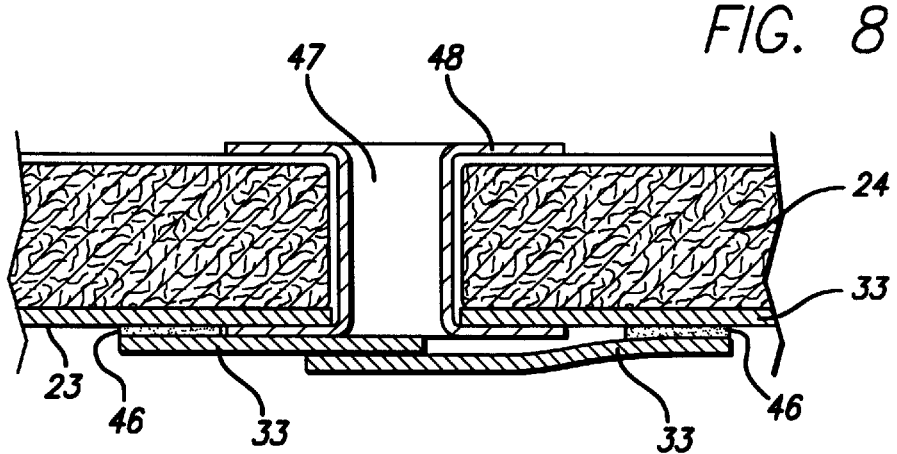
FIG. 8 is an enlarged, exploded, fragmentary cross-sectional view, taken generally along the line and in the direction indicated by the arrows 8—8 in FIG. 5, showing details of an improved fire-blocking insulation blanket according to an embodiment of the present invention.

Insulation blankets are often made with cutouts or holes to accommodate wiring, ducts, and other features of an aircraft interior. A representative cutout 47 is shown in FIG. 5. Cutouts provide a path for the penetration of flames into the interior of the fuselage. A method for reducing the extent to which flames can penetrate into an interior space through a cutout is shown in FIG. 8. Cutout 47 is made into an insulation blanket made with lofted insulation 24 and fire-blocking material 33. The edges of the lofted insulation 24 and fire-blocking material 33 which are revealed by the cutout are covered in a conventional fashion using adhesive tape 48. A patch of fire-blocking material 33 is adhered to the outboard protective covering 23 around the edges of cutout 47. Fire-blocking material 33 overlaps itself at cutout 47, so that when an object is inserted through cutout 47, fire-blocking material 33 will be folded against the inserted object.

Figure 9:
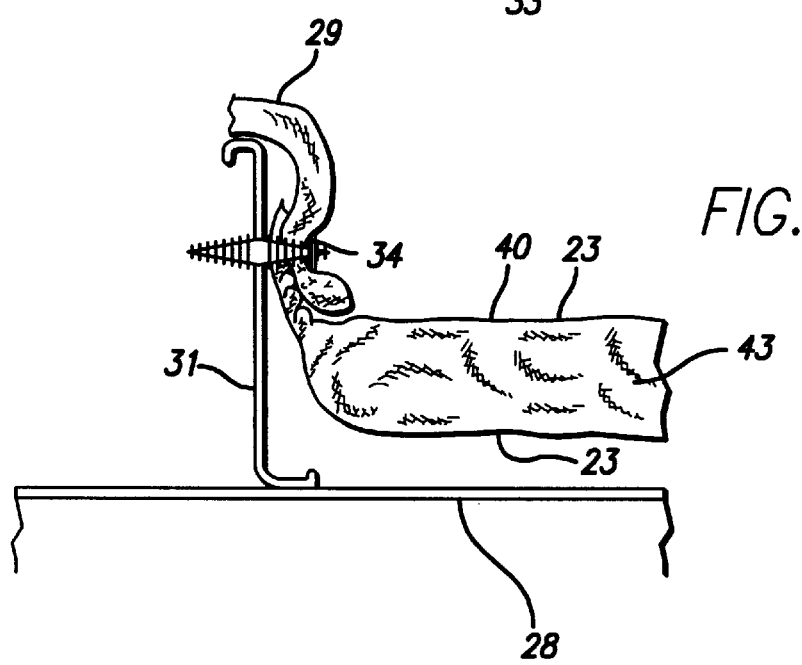
FIG. 9 is a enlarged fragmentary cross-sectional view, taken generally along the line and in the direction indicated by the arrows 3—3 in FIG. 2, showing details of improved fire-blocking insulation blankets constructed and installed between the aircraft frame members and interior to the skin according to an alternative embodiment of the present invention, wherein the lofted insulation has fire-blocking properties.

Blankets according to the present invention may be made with lofted and fire blocking insulation. FIG. 9 shows a partial cross section of a blanket 40 made with lofted and fire-blocking insulation 43 and installed according to the present invention. Lofted and fire-blocking insulation 43 is cut to a width wider than the space between adjacent frame members of the aircraft in which it is to be installed, and sufficiently wide so that it may be folded against and attached to both adjacent frame members along its edges. Lofted and fire blocking insulation 43 is encased between protective coverings 23. Protective coverings 23 are joined together along all edges of the insulation blanket.

Figure 10:
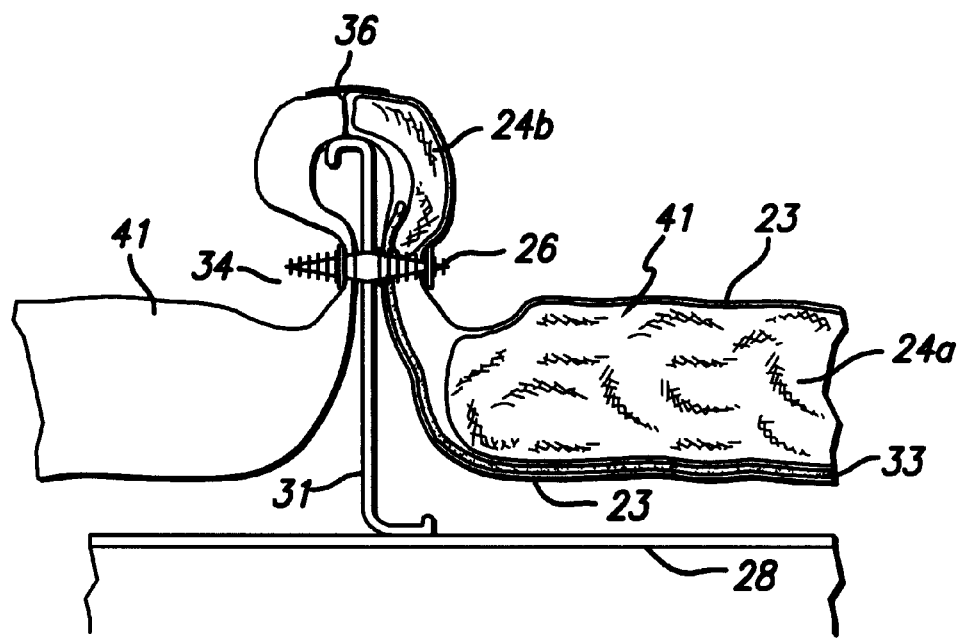
FIG. 10 is a enlarged fragmentary cross-sectional view, taken generally along the line and in the direction indicated by the arrows 3—3 in FIG. 2, showing details of improved fire-blocking insulation blankets constructed and installed between the aircraft frame members and interior to the skin according to an alternative embodiment of the present invention, wherein the width of the insulation blanket is extended to cover the top of the frame member.

A separate, narrow blanket, sometimes called a "capstrip," is commonly used to insulate the aircraft frame itself. A cross section of a capstrip 29 as commonly used today is shown in FIG. 3. Referring to FIG. 10, blankets 41 according to the present invention may also be designed to be attached to one another at the frame members, thereby eliminating the capstrip. A partial cross-section of such a configuration is shown in FIG. 10. Lofted insulation 24a and fire blocking material 33 are enclosed within protective coverings 23 as described in connection with FIG. 7 above. Fire-blocking layer 33 is made wider than lofted insulation 24a and sufficiently wide so that it may be folded against and attached to frame 31. Protective covering 23 is made wider than fire-blocking material 33 and sufficiently wide to extend past the top of frame 31 and to enclose a second piece of lofted insulation 24b for insulating the frame. Blanket 41 is attached to the adjoining blanket 41 using an aircraft-grade adhesive tape 36 such as ORCOTAPE™ OT-7 available from ORCON Corporation.

Blankets constructed according to the present invention are most preferably installed according to the present invention to function most effectively as a fire-blocking blanket. Conventional methods of attachment may be adapted to the present invention. As shown in FIG. 4, one conventional method of attachment utilizes plastic attachment posts 26 in conjunction with plastic washers 34. Attachment posts 26 are fixed in the frame spaced at intervals of about eight inches along its length. A hole 44 large enough to accommodate the attachment post 26 is made through protective covering 23 and fire-blocking material 33 in the selvedge 35 of blanket 20. The hole 44 of selvedge 35 is pushed over the attachment post 26 until the selvedge 35 abuts the frame 31. Capstrip 29 is then installed onto the attachment post in a similar fashion. Plastic washer 34 is then pushed onto the attachment post 26 until selvedge 35 and capstrip 29 are pressed snugly against frame 31. Locking ribs 45 on attachment post 26 hold washer 34 in place. The process is repeated at each attachment post along the length of the frame 31, resulting in essentially continuous attachment of the fire blocking material 33 to the frame 31. The same mode of attachment may be used for other configurations of fire-blocking insulation blankets, as shown in FIGS. 9 and 10. The plastic attachment posts will remain in place during a fuel fire for so long as the attached insulation blanket remains relatively intact, because the blanket tends to protect the attachment post from the heat of the fire.

Figure 11:
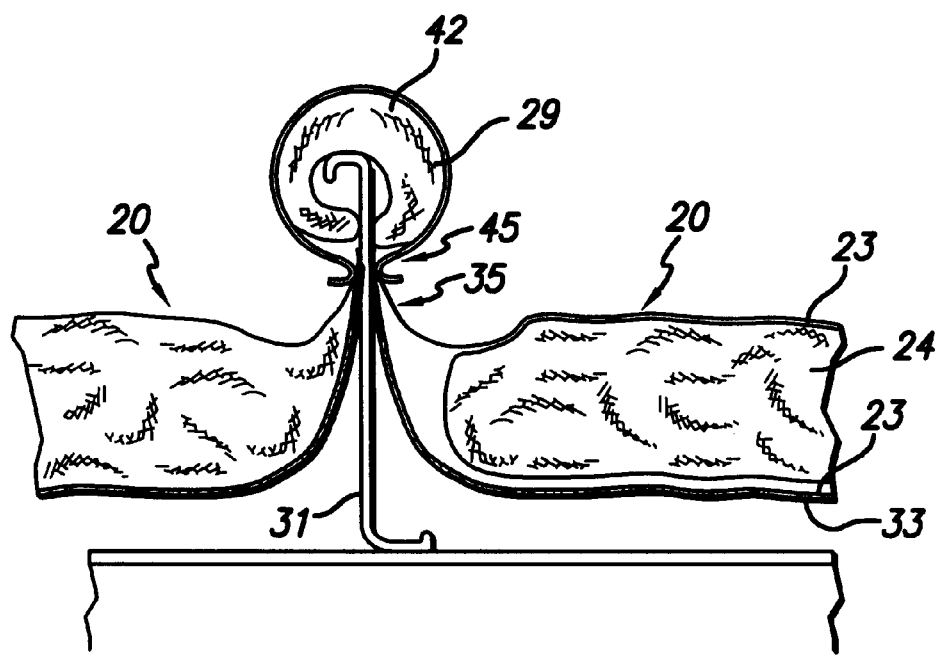
FIG. 11 is a enlarged fragmentary cross-sectional view, taken generally along the line and in the direction indicated by the arrows 3—3 in FIG. 2, showing details of improved fire-blocking insulation blankets constructed and installed between the aircraft frame members and interior to the skin according to an embodiment of the present invention, wherein the method of attachment to the frame is by spring clips.

Another commonly used method for attaching blankets, utilizing a C-shaped spring clip, is shown in FIG. 11. A spring clip may also be used to attach blankets according to the present invention to a frame. Referring to FIG. 11, a spring clip 42 is expanded and placed over capstrip 39 and frame 31. Selvedge 35 of blanket 20, comprising fire-blocking layer 33 and protective covering 23, is inserted under tip 45 of spring clip 42. Spring clip 42 is released and its spring tension holds selvedge 35 against frame 31. The same spring clip is used to hold adjoining blankets to both sides of the same frame, as pictured in FIG. 11. Spring clips are placed along the frame at regular intervals about eight inches apart. Spring clips are typically made of spring steel and therefore will remain in place during a fire. However, spring clips are heavier than plastic attachment posts and therefore less preferred for weight-critical applications.

Various other methods may be used to attach blankets according to the present invention to a frame. Any method employed must hold the fire-blocking layer of the insulation blanket firmly against the frame and must remain in place for as long as the insulation blanket remains intact when the blanket and frame are exposed to conditions typically present in spilled fuel fires. Further attributes of the fastening method will depend on the application. For example, for most aircraft applications, it is desirable that the fastening method be lightweight, durable, removable and reusable.

Blankets according to the present invention may include other features and qualities consistent with insulation blankets in general, without departing from the scope of the invention presented herein. Some of such other features and qualities are described in U.S. Pat. No. 5,108,821 and U.S. Pat. No. 5,624,726, which are incorporated herein by reference. For example, the protective covering may be impermeable to moisture or may be vapor-permeable; or it may be impermeable on one side of the blanket and permeable on the other side.

Objects and advantages of this invention are further illustrated by the following examples, but the particular materials and quantities thereof recited in these examples, as well as other conditions and details, should not be construed to limit this invention.

EXAMPLE 1

Blanket Construction.

A piece of lofted insulation comprised of 2 inch thick 0.42 pcf MICROLITE™ AA Fiberglass from Johns Manville Corporation of Denver, Colorado was cut to the dimensions approximately 20 inches wide and 36 inches long. A piece of fire-blocking material comprised of CURLON® OB-5250G, nominally 0.25 inches thick, from ORCON Corporation of Union City, California, was cut to dimensions approximately 28 inches wide and 36 inches long. Two pieces of protective covering comprised of reinforced polyimide film available under the trade name ORCOFILM™ KN-80 from ORCON Corporation of Union City, Calif. were cut to dimensions approximately 32 inches wide and 40 inches long. The lofted insulation and fire-blocking material were stacked and centered with respect to each other, leaving 4 inches of fire-blocking material protruding from each edge of the lofted insulation. The stack of lofted insulation and fire-blocking material was placed between the two pieces of covering film, so that the covering films contacted each other with a one-inch margin around their perimeters. The covering films were joined together by applying heat from a seaming iron around their margin.

Blanket Testing.

Blankets were tested according to the test procedures released by the FAA in draft form and proposed for inclusion in the Federal Airworthiness Standards (FAR) Part 25, Appendix F, Part IV, "Test Method to Determine the Flammability/Burnthrough Characteristics of Thermal/Acoustical Insulation Materials." The test requires a specimen set consisting of two insulation blankets. The two blankets are installed in a test frame made from ⅛ inch thick steel about 48 inches wide and 36 inches high, with two 20 inch wide by 36 inch long spaces simulating the spaces between adjacent frame members of an aircraft. The blankets are clipped to the frame at regular intervals along both long edges of the blankets using metal spring clips. The frame is inclined 30° from vertical. A modified gun-type oil burner, such as a Park Model DPL 3400 is used with a nozzle, such as a Monarch 80 degree PLP (semi-solid) nozzle, maintaining fuel flow to a nominal 6.0 gallons per hour. A 12 inch burner cone with an opening 6 inches high and 11 inches wide is installed at the end of the draft tube. Fuel oil is supplied at a rate of 6.0 gallons per hour to the burner. The burner is installed perpendicular to the test frame, with the burner cone four inches away from the test frame on the outboard side and directed towards the inboard side at the center of the test frame. The burnthrough time is measured at the inboard side of each of the insulation blanket specimens. The burnthrough time is defined as the time required, in seconds, for the burner flame to penetrate the test specimen, and/or the time required for the heat flux to reach 2.0 Btu/ft2 sec on the inboard side at a distance of 12 inches from the front surface of the insulation test frame.

TABLE 1

Results of Draft FAR 25-F-IV Test for Representative Materials

| Material | Burnthrough Time, secs. |
|---|---|
| Blanket as described in Example 1 | 300 |
| 2 layers of MICROLITE ™ AA Fiberglass, 0.6 pcf, nominal 1.5 inch thick, between single layers of ORCOFILM ™ AN-49W | 37 |
| 1 layer of CURLON ® OB-302, nominal 1.5 inch thick, between single layers of ORCOFILM ™ KN-80 | 117 |
| 2 layers of CURLON ® OB-302 between single layers of ORCOFILM ™ KN-80 | 290 |
| 1 layer of CURLON ® OF-33100N on the outboard side of 2 inches of MICROLITE ™ AA Fiberglass, 0.42 pcf, all between single layers of ORCOFILM ™ KN-80 | 259 |
| 2 layers of CURLON ® OF-33100N on the outboard side | 368 |

TABLE 1-continued

Results of Draft FAR 25-F-IV Test for Representative Materials

| Material | Burnthrough Time, secs. |
|---|---|
| of 2 inches of MICROLITE ™ AA Fiberglass, 0.42 pcf, all between single layers of ORCOFILM ™ KN-80 | |
| 2 inches of MICROLITE ™ AA Fiberglass, 0.42 pcf on the outboard side of 1 layer of CURLON ® OF-33100N, all between single layers of ORCOFILM ™ KN-80 | 119 |
| 2 inches of MICROLITE ™ AA Fiberglass, 0.42 pcf on the outboard side of 2 layers of CURLON ® OF-33100N, all between single layers of ORCOFILM ™ KN-80 | 201 |

EXAMPLE 2

Screening Test for Fire Blocking Materials

Materials were screened for fire blocking properties using the following laboratory scale test. A specimen holder was constructed from two pieces of aluminum sheet material approximately 0.10 inch thick. Each piece was approximately 13 inches square. A circular hole approximately eight inches in diameter was cut in the center of each piece of sheet aluminum. One of the pieces was mounted horizontally to laboratory test stands using laboratory clamps, about 24 inches from the base of the test stands inside of a laboratory hood. An adjustable propane torch, Model TL-44 from TURBOTORCH® of Denton, Tex., was connected to a compatible propane bottle with a shut-off valve. The torch was mounted on a laboratory stand. The nozzle was mounted using a laboratory clamp so that the nozzle of the torch was directed vertically upwards, underneath and directed at the center of the hole in the aluminum piece. The upper end of the torch nozzle was about three inches under the hole in the aluminum sheet.

The propane torch was ignited and adjusted so that the temperature of the flame was approximately 2100° F. measured at the center of the hole in the specimen holder using a type K thermocouple. The propane flow to the torch was then shut off at the shut-off valve.

A calibration specimen consisting of a two inch thick piece of 0.6 pounds per cubic foot MICROLITE™ AA fiberglass cut to approximately 12 inches square was placed on the upper surface of the aluminum sheet. The specimen was centered over the hole in the sheet and its edges were aligned with the edges of the sheet. The second piece of aluminum sheet was placed on top of the specimen and aligned with the specimen and lower sheet. The propane to the torch was turned on and the torch was ignited. A timing clock was started at the time of ignition. The upper surface of the specimen was observed. When the flame from the torch began to penetrate the upper surface of the specimen, the clock was stopped. If the elapsed time to observed flame penetration was less than 30 seconds or more than 40 seconds, the propane flow was adjusted appropriately and the process was repeated with a new calibration specimen until the burnthrough time was between 30 and 40 seconds.

Specimens of materials to be tested were cut twelve inches square. Each specimen to be tested was placed on the upper surface of the horizontal aluminum piece, centered over the hole in the piece and with the edges of the specimen aligned with the edges of the piece. The second aluminum plate was set on top of the specimen and aligned with the lower plate. The propane to the torch was turned on and the torch was ignited. A timing clock was started at the time of ignition. The upper surface of the specimen was observed. When the flame from the torch began to penetrate the upper surface of the specimen, the clock was stopped. The process was repeated for three essentially identical specimens of each material tested. The average of the three measurements for some representative materials is reported in Table 2 below.

TABLE 2

Results of Fire Blocking Screening Test for Representative Materials

| Material | Burnthrough Time, secs. |
|---|---|
| MICROLITE ™ AA Fiberglass, 0.6 pcf, nominal 1.5 inch thick | 16 |
| 2 layers of MICROLITE ™ AA Fiberglass, 0.6 pcf, nominal 1.5 inch thick | 35 |
| CURLON ® OB-302 (nominal 1.5 inch thick) | 336 |
| 2 layers of CURLON ® OB-302 | 645 |
| 2 layers of CURLON ® OB-302 set between single layers of ORCOFILM ™ KN-80 | 785 |
| NEXTEL ™ non-woven scrim, 1.55 oz./sq. yard, overlain with MICROLITE ® AA Fiberglass, 0.6 pcf, 1 inch thick | >2700 |

Various modifications and alterations of the embodiments of this invention disclosed in this application will become apparent to those skilled in the art without departing from the scope of this invention. The scope of this invention is to be determined from the appended claims, and is not to be limited by the illustrative embodiments set forth herein.

What is claimed is:

1. An insulation blanket, having two long edges, for installation between parallel structural frame members spaced a distance apart, said insulation blanket comprising lofted insulation adjacent to fire blocking material, wherein said lofted insulation has a width substantially equal to said distance between said parallel structural frame members, and said fire blocking material has a width sufficiently greater than said distance between said parallel structural frame members and extends beyond the width of said lofted insulation along at least said two long edges so that said fire blocking material may be folded against and attached to each of said parallel structural frame members when said insulation is placed between said parallel structural frame members.

2. An insulation blanket according to claim 1 further comprising a protective covering wherein said lofted insulation is encased within said protective covering.

3. An insulation blanket according to claim 2 wherein said fire blocking material is adhered to said protective covering exterior to at least one side of said insulation blanket.

4. An insulation blanket according to claim 2 wherein said protective covering forms a selvedge along said long edges of said insulation blanket.

5. An insulation blanket according to claim 4, wherein said fire blocking material extends beyond said lofted insulation adjacent to said selvedge.

6. An insulation blanket according to claim 1 further comprising a protective covering wherein said lofted insulation and said fire blocking material are encased within said protective covering.

7. An insulation blanket according to claim 6 wherein said protective covering forms a selvedge along said long edges of said insulation blanket.

8. An insulation blanket according to claim 7, wherein said fire blocking material extends beyond said lofted insulation and into said selvedge.

9. An insulation blanket according to claim 1 wherein said fire blocking material comprises heat treated partially carbonized polyacrylonitrile.

10. An insulation blanket according to claim 1 wherein said fire blocking material comprises a non-woven scrim comprising ceramic oxide fibers.

11. An insulation blanket according to claim 1 wherein said lofted insulation comprises fiberglass.

12. An insulation blanket for use in insulating aircraft and for installation between structural frame members thereof, said insulation blanket comprising:

at least one layer of lofted insulation, said at least one layer of lofted insulation having edges;

a protective covering enclosing said at least one layer of lofted insulation and said edges;

at least one layer of fire blocking material adjacent to said at least one layer of lofted insulation and to said protective covering, said at least one layer of fire-blocking material extending beyond at least two opposing ones of said edges of said at least one layer of lofted insulation for a distance sufficient to permit said at least one layer of fire-blocking material to be folded against and attached to the adjacent structural frame members of the aircraft when said insulation blanket is installed therein.

13. The insulation blanket of claim 12, wherein said at least one layer of fire blocking material is enclosed within said protective covering.

14. The insulation blanket of claim 12, wherein said protective covering further comprises a selvedge, and wherein said at least one layer of fire blocking material extends into said selvedge.

15. An insulation blanket according to claim 12, wherein said at least one layer of fire blocking material comprises heat-treated partially carbonized polyacrylonitrile.

16. An insulation blanket according to claim 12, wherein said at least one layer of fire blocking material comprises a non-woven scrim comprising ceramic oxide fibers.

* * * * *